Figure 1:
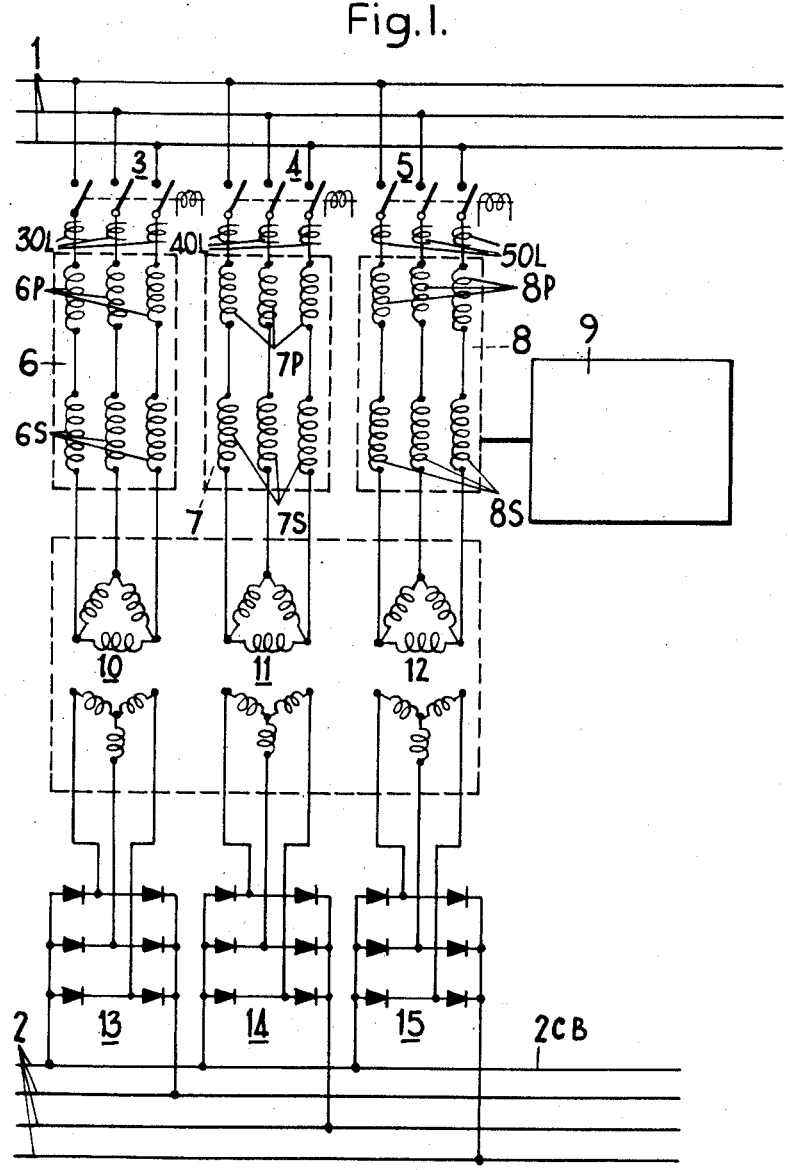

INVENTOR
BERNARD HUGH STONEHOUSE
BY
ATTORNEYS

INVENTOR
BERNARD HUGH STONEHOUSE
BY
ATTORNEYS

United States Patent Office 2,891,211
Patented June 16, 1959

2,891,211

ELECTRIC SUPPLY ARRANGEMENTS

Bernard Hugh Stonehouse, Orpington, England, assignor to The General Electric Company Limited, London, England Application January 10, 1957, Serial No. 633,453

Claims priority, application Great Britain January 11, 1956

15 Claims. (Cl. 321—24)

This invention relates to electric supply arrangements, and more particularly, but not exclusively, to electric supply arrangements for synchronous polyphase electric motors.

Where it is required to operate a synchronous motor such as described in copending application Serial No. 633,452 filed January 10, 1957 by Joseph Pritchard Huggard and Peter Scott for Electric Motors and assigned to the assignee of this application, at low or even zero speed, a low frequency polyphase supply is required for the motor and it is convenient to derive this supply from say the ordinary mains supply of standard 50 cycle frequency. Thus, it may be desirable to provide a low frequency supply of frequency varying between 0 and 5 cycles per second and one object of the present invention is the provision of means whereby such a supply can be obtained.

According to the present invention, an electric supply arrangement for providing a pulsating or cyclicly varying direct current supply of predetermined low or zero frequency from an alternating current supply of higher frequency comprises an induction regulator arranged to be connected with the said A.C. supply, driving means for rotating the rotor of the induction regulator at a predetermined speed, and rectifying means for rectifying the varying output voltage of the induction regulator.

Dependent upon the speed of rotation of the rotor of the induction regulator, so the frequency of the direct current supply will vary and if the rotor be locked in one position, then the said frequency will be zero.

If a polyphase D.C. supply is required, a plurality of induction regulators may be used, the rotors of the regulators being phase displaced with respect to each other. Thus, if a three phase cyclicly varying D.C. supply is required, three induction regulators with their rotors displaced electrically 120° to each other and driven by common driving means may be used, each regulator feeding its own rectifying means.

The main A.C. supply may be three phase, in which case the or each induction regulator would be a three phase regulator and have its primary and secondary windings connected in series.

Instead of using three three phase induction regulators of known form, a single induction regulator of special construction may be used. Alternatively, it is possible to use a standard induction regulator in conjunction with a four-winding three phase transformer, and this latter arrangement may be employed together with three further induction regulators and transformers to provide a direct current supply having a waveform corresponding to a sine squared function.

The pulsating or cyclicly varying direct current supply may in its turn be used to provide an alternating current supply of predetermined low frequency by switching alternate positive cycles of the direct current supply, for example through a slip ring and commutator arrangement or through a change-over contactor.

Figure 2:
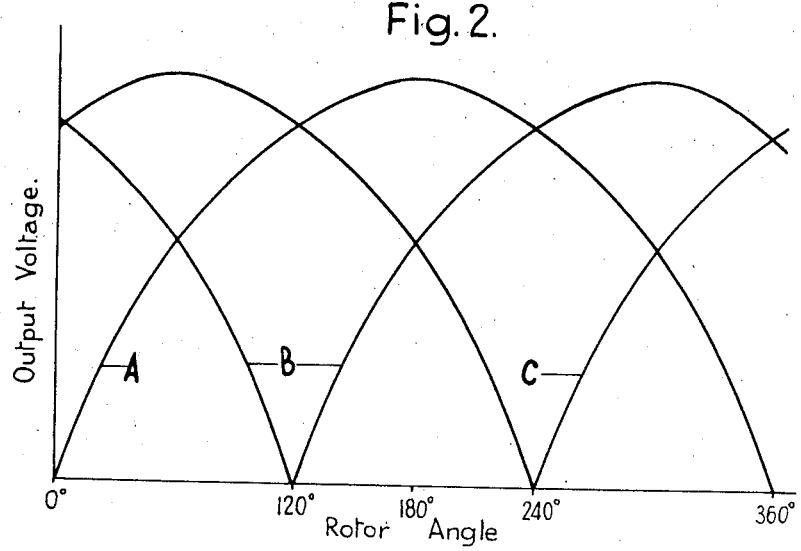
Figure 3:
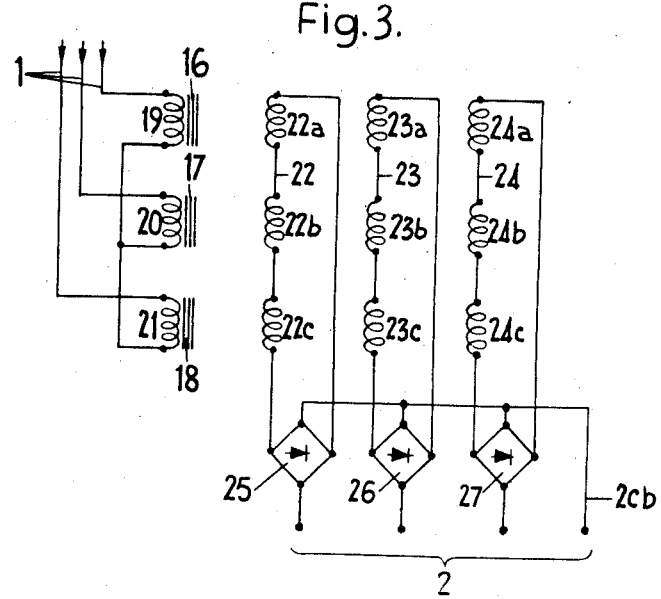
Figure 4:
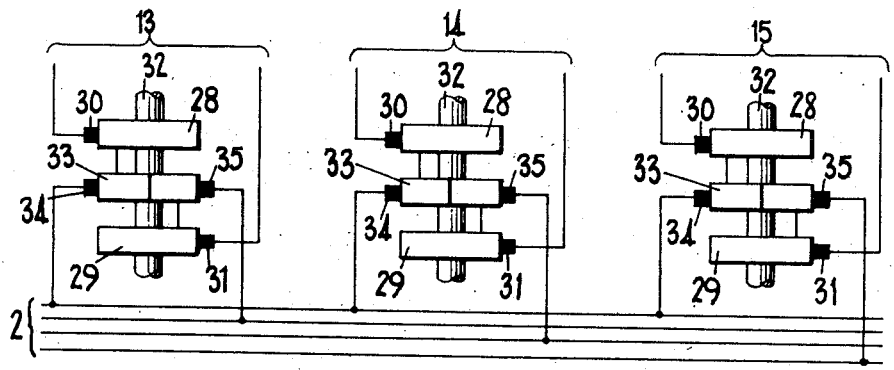
Figure 5:
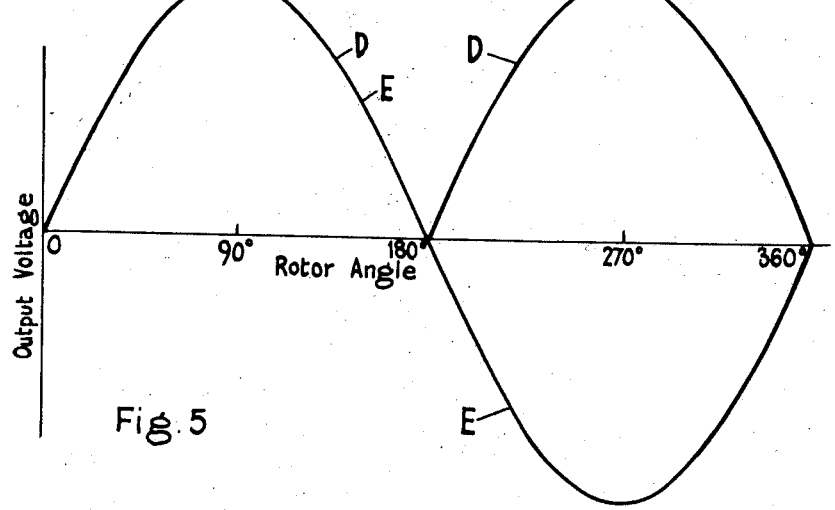
Figure 6:
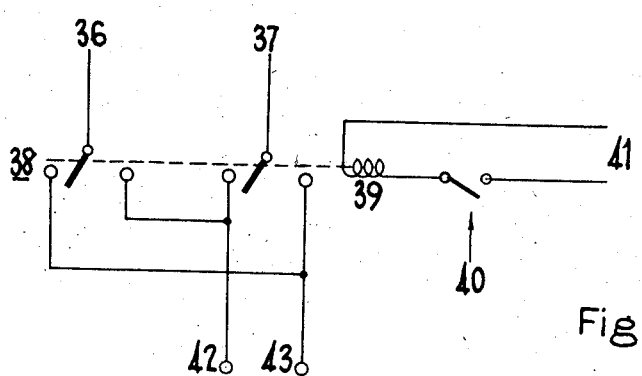
Figure 7:
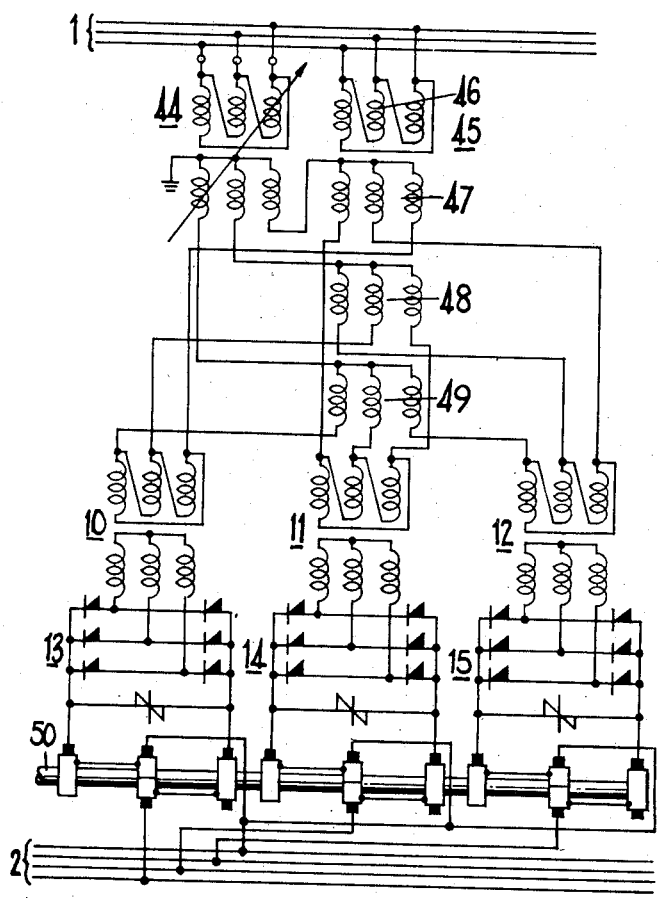
Figure 8:
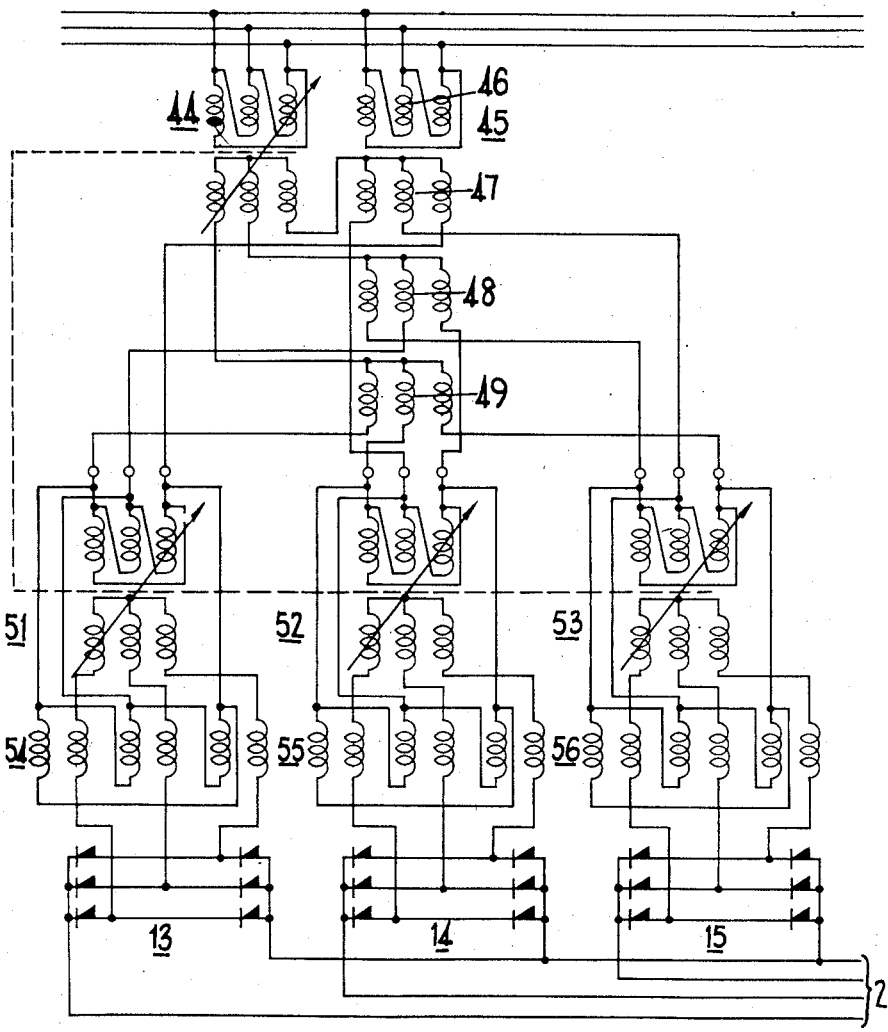

In order that the invention may be clearly understood, six electric supply arrangements in accordance with the invention will now be described by way of example with reference to the eight figures of the accompanying diagrammatic drawings in which Figure 1 shows the circuit of the first arrangement for which Figure 2 is an explanatory diagram, Figure 3 shows the essential elements of the second arrangement, Figures 4 and 5 show circuit elements and an explanatory diagram respectively of the third arrangement, Figure 6 shows circuit elements of the fourth arrangement, Figure 7 shows the circuit of the fifth arrangement and Figure 8 shows the circuit of the sixth arrangement.

Referring now to Figure 1, the supply arrangement shown in this figure is intended to operate from a normal three phase alternating current supply 1 of standard 50 cycle frequency and to supply to busbars 2 a three phase cyclicly varying direct current supply which may feed an electric motor (not shown) having a permanent magnet rotor and two stator windings as described in the said copending application. The D.C. supply frequency can be made to vary continuously from zero to enable the speed of the motor, which acts as a synchronous motor, to be controlled and at zero frequency, the supply to the motor can be such that the motor exerts sufficient torque to hold or support a load at rest.

The supply arrangement, proceeding from the A.C. supply 1, comprises three three phase supply contactors 3, 4, and 5 each provided with an overload trip coil 30L, 40L or 50L, and three three phase induction regulators 6, 7 and 8 whose primary windings 6P, 7P and 8P are connected respectively in series with their secondary windings 6S, 7S and 8S so that the output voltage of a regulator can be varied continuously from a low value to a maximum value by rotation of the regulator rotor. Alternatively, the primary and secondary windings may both be connected to the supply, thus allowing the output voltage to be reduced to zero. The rotors, which may carry the primary or the secondary windings of the regulators, are mechanically coupled together so that their output voltages are separated electrically by 120° and the three rotors are arranged to be rotated by driving means 9 which may be a geared electric motor or an electric motor and a gear box. The driving means 9 is such that the rotors of the regulators 6, 7 and 8 can be held stationary or rotated at a speed varying continuously upwards from zero to a predetermined maximum speed.

The output of each regulator is rectified, there being associated with each regulator a delta-star transformer 10, 11 or 12 and a three phase full wave dry-plate rectifier network 13, 14 and 15, and each rectifier network has its own direct current output terminal connected to a common or neutral busbar 2CB of the busbars 2 whilst its other direct current output terminal is connected to one of the three remaining busbars 2. In supplying a motor such as that described in said co-pending application each of the three phases of the three phase stator winding of the motor would be connected between the common busbar 2CB and one of the other busbars, and the speed of the motor would be controlled by control of the speed of rotation of the rotors of the induction regulators 6, 7 and 8.

As will be appreciated, as the rotor of each induction regulator turns through a complete revolution, so its output voltage will rise to a maximum from zero and then decrease again to zero, the maximum voltage being the arithmetic sum of the primary and secondary voltages. The output of each regulator is rectified so that the voltage which appears across the output terminals of the network 13, 14 or 15 is dependent only on the magnitude of the regulator output voltage and not its frequency, and referring to Figure 2, curve A shows the relation between the output voltage of the rectifier network 13 and the position of the rotor of the induction regulator 6. The curves B and C show the rectified output voltages of the regulators 7 and 8 respectively and due to the electrical angular displacements of the regulator rotors by ±120°, these curves are displaced ±120° from the curve A. A cyclic variation of the three rectified output voltages is obtained by driving the rotors of the induction regulators 6, 7 and 8 and the frequency cyclic variation is determined by the speed at which the rotors are driven. The arrangement is particularly suitable for providing a cyclic frequency variation of from 0 to 5 cycles per second from the main 50 cycle A.C. supply.

In the second arrangement in accordance with the invention, the three three phase induction regulators 6, 7 and 8 of Figure 1 are replaced by a single induction regulator of special construction and referring now to Figure 3 the single regulator comprises a rotor driven in the same manner as before and provided with three separate magnetic cores 16, 17 and 18 each wound with one phase winding 19, 20 or 21 connected with the main A.C. supply 1. The three cores 16, 17 and 18 are mounted on the same shaft of the regulator and so that the magnetic poles resulting from the phase windings 19, 20 and 21 are displaced ±120° electrically to one another in space.

The stator of the regulator comprises a single magnetic core which is coupled magnetically with the three rotor cores and windings and which carries three windings 22, 23 and 24, each winding consisting of three parts such as 22A, 22B and 22C: the A, B and C parts of the windings 22, 23 and 24 are associated respectively with the cores and windings 16, 19, 17, 20 and 18, 21 and the three windings 22, 23 and 24 arranged similarly to the normal three phase windings of a regulator are displaced 120° electric round the core. The outputs of the windings are rectified by rectifying networks 25, 26 and 27 to supply the D.C. busbars 2 as before. If desired, smoothing networks may be associated with the rectifying networks to remove the ripple frequency which is twice the frequency of the main A.C. supply 1.

It is convenient to refer at this stage to the fact that the pulsating or cyclicly varying direct current supply provided in accordance with the invention may in turn be used to provide an alternating current supply by the employment of switching means to reverse the sign of alternate positive cycles of the direct current supply. A simple way in which this may be effected is shown in Figure 4 and this may best be explained by considering it in conjunction with Figure 1. Each pair of positive and negative leads carrying the direct current supply from one of the rectifier networks 13, 14 or 15 of Figure 1 is taken to two slip-rings 28, 29 through stationary brushes 30, 31. The slip-rings 28, 29 are mounted on a common shaft 32 together with a two-segment commutator 33, one segment of which is connected to slip-ring 28 while the other segment is connected to slip-ring 29. The shaft 32 with slip-rings 28, 29 and commutator 33, on opposite sides of the surface of which brushes 34, 35 are arranged to bear, constitute switching means. Each shaft 32 is geared to the shaft from the driving means 9 to its corresponding induction regulator 6, 7 or 8 so that it is rotated at a speed related to the speed at which the induction regulators are driven; the gearing ratio depends upon the number of poles of the induction regulator. It will be remembered that the rotors of the induction regulators 6, 7 and 8 are mechanically coupled together so that their output voltages are separated electrically by 120°, and the relative positioning of the segments on the commutator 33 between the three switching means is arranged accordingly to preserve the phase displacement in the alternating current supply to the busbars 2, which is taken from the pairs of brushes 34, 35 bearing on the commutator surfaces.

Referring now to Figure 5, the curve D—D shows the output voltage from each rectifier 13, 14 or 15, which consists of the positive half waves only of a sine wave. The curve E—E shows the resultant output voltage waveform from each pair of brushes 34, 35, which is that of a pure sine wave. The switching arrangement may be comparatively simple, as both voltage and current are zero at the time of switching.

Figure 6 shows an alternative arrangement to that shown in Figure 4 for providing an alternating current supply from the direct current supply, and in this case only one pair of leads 36, 37 carrying the direct current supply is shown for simplicity. The switching means in this arrangement comprises a double pole change-over type contactor 38 whose operating coil 39 is arranged to be energised and de-energised alternately with a frequency related to the speed of the induction regulator concerned; this may be effected, for example, by a contact 40 operated from a supply 41 through a suitable cam on a shaft geared to the regulator shaft in a manner similar to that already described. The output supply from terminals 42, 43 may then be arranged to be a pure sine wave as before.

Such arrangements as those shown in Figure 4 and Figure 6 can of course be applied to other circuits providing a direct current supply in accordance with the invention; for example, they can be applied to the arrangement of Figure 3, the output from each of the three rectifiers 25, 26 and 27 being taken to switching means such as those described. A further circuit in which this is done is shown in Figure 7. Here, in order to provide a three phase pulsating or cyclicly varying direct current supply from a three phase main alternating current supply of higher frequency, a three phase four pole induction regulator 44 of standard construction is employed in conjunction with a four-winding three-phase transformer 45. This transformer 45 has a single primary winding 46 and three secondary windings 47, 48, 49, the single primary winding 46 of the transformer 45 being arranged to be connected to the main alternating current supply 1, and the three secondary windings 47, 48, 49 in conjunction with the induction regulator 44 being connected in the manner shown through the transformers 10, 11 and 12 and rectifier networks 13, 14 and 15 already mentioned in connection with the circuit of Figure 1, so as to provide the direct current supply. This supply is then passed through the switching means already described in connection with Figure 4, the three switching means being here mounted on a single shaft 50 geared to the shaft of the induction regulator 44. The output from the switching means is taken to busbars 2 which then provide an alternating current supply of predetermined low frequency. A cam-operated contactor arrangement of the type described with reference to Figure 6 can of course be used instead of the commutator and slip rings, and where these latter are used it may be desirable to incorporate switched circuits for short-circuiting the slip-rings and commutator when they are stationary so as to avoid difficulties with the brush contacts.

In using these circuits to operate synchronous motors, it is often more convenient to use a supply of alternating or sinusoidal form such as that provided for example by Figure 7 rather than a pulsating or cyclicly varying direct current supply, although this latter may sometimes be preferable when the highest degree of reliability is required and all contactors and moving parts have to be reduced to a minimum. Figure 8 shows a circuit which provides a three phase pulsating direct current supply having certain advantages. The induction regulator 44 and four winding three phase transformer 45 with its single primary winding 46 and three secondary windings 47, 48, 49 are again used in the same way as described with reference to Figure 7, but three further induction regulators 51, 52, 53 ganged to the regulator 44 and each in conjunction with a three phase transformer 54, 55 or 56 are arranged to be connected in the output from the transformer 45 before it passes through the rectifiers 13, 14 and 15. The direct current waveform at the output supply busbars 2 then has a shape corresponding to a sine squared function. The main advantage of this is that if the three phase output is applied to a normal three phase wound electric motor the resultant flux vector in the air gap of the motor rotates at constant speed and is of constant magnitude.

I claim:

1. An electric supply arrangement for providing polyphase cyclicly varying direct current from a source of alternating current, comprising a plurality of stationary inductance means, a rotatable inductance means associated with each said stationary inductance means, at least one corresponding member of each association of induction means being adapted for connection to said source of alternating current, the outputs of said associated means being arranged in operation to be in a desired phase relationship to each other, driving means adapted to rotate said rotatable inductance means at a speed of rotation in the range including zero and a predetermined maximum, and means for rectifying the outputs of said associated inductance means, the outputs of said rectifying means being arranged relative to one another to provide a polyphase output of cyclicly varying direct current.

2. An electric supply arrangement for providing polyphase cyclicly varying direct current from a source of alternating current, comprising an induction regulator, said induction regulator having a rotor with at least two separate magnetic cores, each said core being provided with a winding adapted for connection to said source of alternating current, said cores being disposed in predetermined phase relationship to each other, and said regulator having a stator with a single magnetic core provided with at least one winding arranged to cooperate with each of said magnetic cores of said rotor, driving means adapted to rotate said rotor at a speed of rotation in the range including zero and a predetermined maximum, and means for rectifying the outputs of said stator windings, the outputs of said rectifying means being arranged relative to one another to provide a polyphase output of cyclicly varying direct current.

3. An electric supply arrangement for providing a three-phase cyclicly varying direct current from a three-phase source of alternating current, comprising an induction regulator, said induction regulator having a rotor with three separate magnetic cores, each of said cores being disposed at electrically equal angles with respect to the other two, each said core being provided with a winding adapted for connection to a respective phase of the alternating current source, and said regulator having a stator with a single magnetic core, said stator core being coupled magnetically with each of said rotor cores and being provided with at least one winding arranged to cooperate with each of said magnetic cores of said rotor, driving means adapted to rotate said rotor at a speed of rotation in the range including zero and a predetermined maximum, and means for rectifying the outputs of said stator windings, the outputs of said rectifying means being arranged relative to one another to provide a three-phase output of cyclicly varying direct current.

4. An electric supply arrangement for providing a polyphase cyclicly varying direct current from a source of alternating current, comprising a plurality of induction regulators adapted for connection to said source of alternating current, the rotors of said regulators being arranged for rotation in predetermined phase displacement to each other, driving means adapted to rotate the rotors of said regulators at a speed of rotation in the range including zero and a predetermined maximum, and means for rectifying the outputs of said regulators, the outputs of said rectifying means being arranged relative to one another to provide a polypphase output of cyclicly varying direct current.

5. An electric supply arrangement for providing a polyphase cyclicly varying direct current for a source of alternating current comprising a plurality of induction regulators adapted for connection to said source of alternating current, common mounting means for the rotors of said regulators, said rotors being disposed in predetermined phase relationship to each other on said mounting means, driving means adapted to rotate said mounting means at a speed of rotation in the range including zero and a predetermined maximum, and means for rectifying the outputs of said regulators, the outputs of said rectifying means being arranged relative to one another to provide a polyphase output of cyclicly varying direct current.

6. An electric supply arrangement for providing a three-phase cyclicly varying direct current from a three-phase source of alternating current, comprising a three-phase transformer having a single three-phase primary winding and three three-phase secondary windings, said primary winding being adapted for connection to said source of alternating current, a three-phase induction regulator adapted for connection to said source of alternating current, each phase of the output of the regulator being connected respectively to one of said secondary windings, driving means adapted to rotate the rotor of said regulator at a speed of rotation in the range including zero and a predetermined maximum, and means for rectifying the outputs of said secondary windings, the outputs of said rectifying means being arranged relative to one another to provide a three-phase output of cyclicly varying direct current.

7. An electric supply arrangement for providing a three-phase cyclicly varying direct current from a three-phase source of alternating current, comprising a four-winding transformer having a single three-phase primary winding and three three-phase secondary windings, said primary winding being adapted for connection to said source of alternating current, a three-phase induction regulator adapted for connection to said source of alternating current, each phase of the output of the regulator being connected respectively to one of said secondary windings, driving means adapted to rotate the rotor of said regulator at a speed of rotation in the range including zero and a predetermined maximum, three three-phase transformers the input windings of which are connected respectively to the said secondary windings of said four-winding transformer, and means for rectifying the three-phase output of each of said three transformers, the outputs of said rectifying means being arranged relative to one another to provide a three-phase output of cyclicly varying direct current.

8. An electric supply arrangement for providing a three-phase cyclicly varying direct current having a waveform corresponding to a sine-squared function from a three-phase source of alternating current, comprising a four-winding three-phase transformer having a single three-phase primary winding and three three-phase secondary windings, said primary winding being adapted for connection to said source of alternating current, a three-phase induction regulator adapted for connection to said source of alternating current, each phase of the output of said regulator being connected respectively to one of said secondary windings, driving means adapted to rotate the rotor of said regulator at a speed of rotation in the range including zero and a predetermined maximum, three further three-phase induction regulators, the inputs of each said further regulator being connected to the respective phases of each of the secondary windings of said four-winding transformers, the rotors of said further regulators being adapted for rotation in phase with said first regulator, and means for rectifying the outputs of said three further regulators, the outputs of said rectifying means being arranged relative to one another to provide a three-phase output of cyclicly varying direct current.

9. The combination of the electric supply arrangement as claimed in claim 1 with switching means and output terminations, said switching means being adapted to reverse in sign at said terminations alternate cycles of the rectified output of said associated inductance means, and thereby to provide a source of polyphase alternating current of frequency equal to the speed of rotation of said inductance means.

10. The combination of the electric supply arrangement as claimed in claim 2, with switching means and output terminations, said switching means being adapted to reverse in sign at said terminations alternate cycles of the rectified output of said stator windings, and thereby to provide a source of polyphase alternating current of frequency equal to the speed of rotation of said rotor.

11. The combination of the electric supply arrangement as claimed in claim 3, with switching means and output terminations, said switching means being adapted to reverse in sign at said terminations alternate cycles of the rectified output of said stator windings, and thereby to provide a source of polyphase alternating current of frequency equal to the speed of rotation of said rotor.

12. The combination of the electric supply arrangement as claimed in claim 4, with switching means and output terminations, said switching means being adapted to reverse in sign at said terminations alternate cycles of the rectified outputs of said regulators, and thereby to provide a source of polyphase alternating current of frequency equal to the speed of rotation of said rotor.

13. The combination of the electric supply arrangement as claimed in claim 5, with switching means and output terminations, said switching means being adapted to reverse in sign at said terminations alternate cycles of the rectified outputs of said regulators, and thereby to provide a source of polyphase alternating current of frequency equal to the speed of rotation of said rotor.

14. The combination of the electric supply arrangement as claimed in claim 6, with switching means and output terminations and switching means being adapted to reverse in sign at said terminations alternate cycles of the rectified outputs of each of said secondary windings and thereby to provide a source of polyphase alternating current of frequency equal to the speed of rotation of said rotor.

15. The combination of the electric supply arrangement as claimed in claim 7, with switching means and output terminations, said switching means being adapted to reverse in sign at said terminations alternate cycles of the rectified outputs of each of said three transformers, and thereby to provide a source of polyphase alternating current of frequency equal to the speed of rotation of said rotor.

References Cited in the file of this patent

UNITED STATES PATENTS

| | | |
|---|---|---|
| 1,939,455 | Livingston | Dec. 12, 1933 |
| 2,541,093 | Page | Feb. 13, 1951 |